United States Patent
Sado

(10) Patent No.: US 8,213,091 B2
(45) Date of Patent: Jul. 3, 2012

(54) WIDE-ANGLE PROJECTION ZOOM LENS AND PROJECTION DISPLAY DEVICE

(75) Inventor: Kenzo Sado, Saitama (JP)

(73) Assignee: Fujifilm Corporation, Tokyo (JP)

( * ) Notice: Subject to any disclaimer, the term of this patent is extended or adjusted under 35 U.S.C. 154(b) by 156 days.

(21) Appl. No.: 12/845,477

(22) Filed: Jul. 28, 2010

(65) Prior Publication Data

US 2011/0026132 A1 Feb. 3, 2011

(30) Foreign Application Priority Data

Jul. 29, 2009 (JP) ................................ P2009-176890

(51) Int. Cl.
G02B 15/14 (2006.01)
G02B 13/18 (2006.01)
G02B 3/02 (2006.01)

(52) U.S. Cl. ...................................... 359/682; 359/714
(58) Field of Classification Search .................. 359/680, 359/682, 714, 753, 663

See application file for complete search history.

(56) References Cited

U.S. PATENT DOCUMENTS

| | | | |
|---|---|---|---|
| 7,755,843 B2 * | 7/2010 | Yamasaki | ..................... 359/680 |
| 2007/0195427 A1 | 8/2007 | Sugita | |

FOREIGN PATENT DOCUMENTS

| | | |
|---|---|---|
| JP | 2007-225877 A | 9/2007 |
| JP | 2007-304268 A | 11/2007 |
| JP | 2009-14819 A | 1/2009 |

* cited by examiner

*Primary Examiner* — Alicia M Harrington
(74) *Attorney, Agent, or Firm* — Birch, Stewart, Kolasch & Birch, LLP

(57) ABSTRACT

A wide-angle projection zoom lens includes: a first negative lens group for focus adjustment that is fixed when power varies; a second positive lens group, a third negative lens group, and a fourth positive lens group that are moved when power varies; and a fifth positive lens group that is fixed when power varies. The first to fifth lens groups are arranged in this order from a magnification side. The first lens group includes a first negative lens, which is an aspheric lens made of plastic, a second negative lens, a third negative lens, and a fourth positive lens which are arranged in this order from the magnification side. The wide-angle projection zoom lens is configured so as to satisfy four predetermined conditional expressions.

7 Claims, 13 Drawing Sheets

EXAMPLE 1

EXAMPLE 1 (WIDE)

EXAMPLE 1

EXAMPLE 2 (WIDE)

EXAMPLE 2

EXAMPLE 3 (WIDE)

EXAMPLE 4 (WIDE)

EXAMPLE 4

FIG. 10
EXAMPLE 2
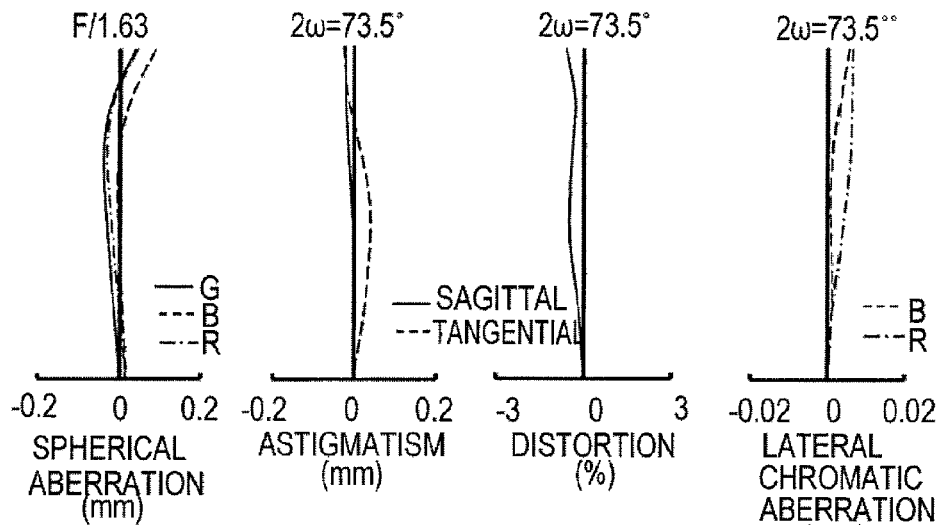
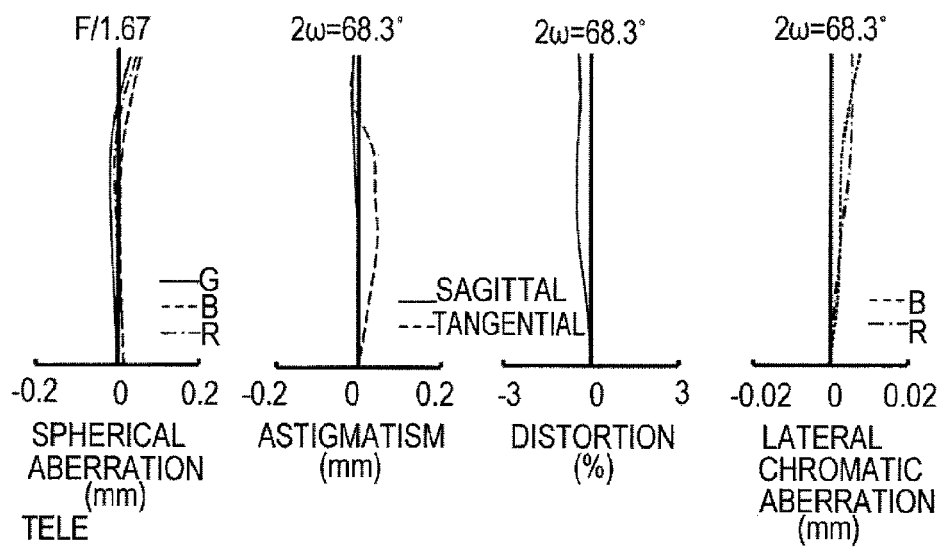
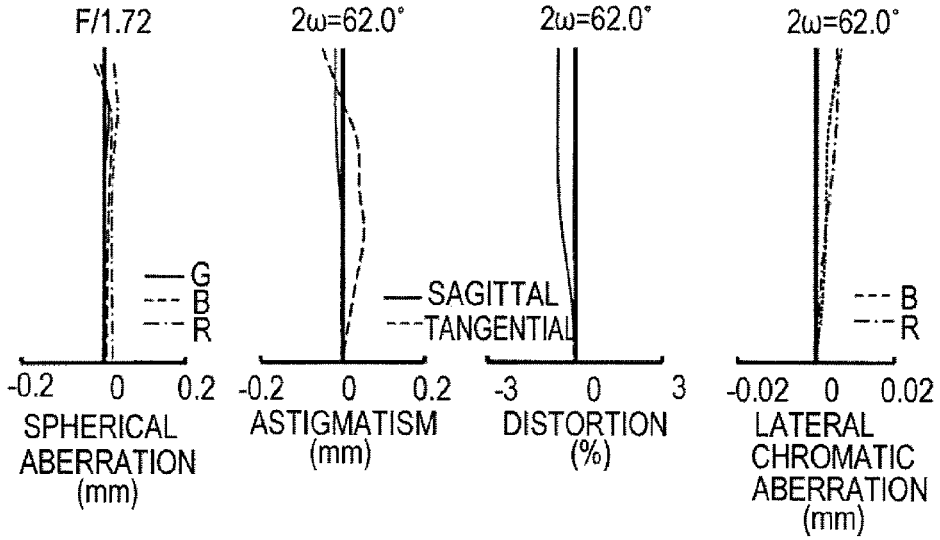

EXAMPLE 3

EXAMPLE 4

WIDE-ANGLE PROJECTION ZOOM LENS AND PROJECTION DISPLAY DEVICE

CROSS-REFERENCE TO RELATED APPLICATIONS

This application is based upon and claims the benefit of priority from the Japanese Patent Application No. 2009-176890 filed on Jul. 29, 2009; the entire contents of which are incorporated herein by reference.

BACKGROUND OF THE INVENTION

1. Field of the Invention

The present invention relates to a wide-angle projection zoom lens that is used as a projection lens of, for example, a projector, and more particularly, to a wide-angle projection zoom lens that is suitable to enlarge and project the original image formed by a light beam which is modulated by a light valve, such as a liquid crystal display element or a micromirror device, onto a screen and a projection display device including the same.

2. Description of the Related Art

In recent years, a so-called front projection projector that projects an image onto a screen that is provided in front of the projector has been widely used for school education, business training, or presentation. In addition, with the digitization of television broadcasting, there is an increasing demand for a system that can display an image on a large screen in the home. Therefore, there is an increasing demand for a front projection projector with a screen size of more than 80 inches.

A projection lens provided in the projector needs to have a small size and a wide angle of view in order to prevent light from being incident on the eye of an explainer or a presenter who stands near the screen or prevent a projection image from being shielded by the explainer or the presenter, and in order to increase the screen size in a small room space. In addition, there is a demand for a projection lens with a zoom function in order to facilitate the alignment of a screen size with a projection screen size.

In recent years, a transmissive or reflective liquid crystal display element or a digital micromirror device (DMD) manufactured by Texas Instruments Inc., which is a representative example of a micromirror device, has generally been used as a light modulating device (light valve). However, a projection lens used for a projector using the light valve needs to have a long back focal length and a telecentric reduction side (light valve side).

For example, JP-A-2007-225877, JP-A-2007-304268, and JP-A-2009-014819 disclose projection zoom lenses that meet the above-mentioned demands.

In recent years; there is an increasing demand for an apparatus that can project a clear image in a relatively bright room environment such that the user can read data or take a memo while viewing the image projected onto the screen.

It is preferable to obtain a fast projection lens with a small F number in order to meet the demand. It is difficult to effectively correct various aberrations while obtaining a wide-angle and fast zoom lens. In particular, it is difficult to prevent an increase in the various aberrations in the periphery of the screen.

JP-A-2007-225877, JP-A-2007-304268, and JP-A-2009-014819 do not disclose a zoom lens that can meet the above-mentioned demand and has a high speed of F1.6 and an angle of view of more than 70 degrees at the wide angle end.

SUMMARY OF THE INVENTION

The invention has been made in order to solve the above-mentioned problems, and an object of the invention is to provide a wide-angle projection zoom lens that has a small size, and a high speed of F1.6 and an angle of view of more than 70 degrees at a wide angle end, and can maintain a good optical performance over the entire zoom range, and a projection display device including the wide-angle projection zoom lens.

According to an aspect of the invention, a wide-angle projection zoom lens includes a first lens group having a negative refractive power, a second lens group having a positive refractive power, a third lens group having a negative refractive power, a fourth lens group having a positive refractive power, and a fifth lens group having a positive refractive power. The first to fifth lens groups are arranged in this order from a magnification side and a reduction side has telecentricity. During zooming from a wide angle end to a telephoto end, the first lens group and the fifth lens group are fixed, and the second lens group, the third lens group, and the fourth lens group are moved to the magnification side on an optical axis while changing gaps therebetween. The first lens group includes a first negative lens, a second negative lens, a third negative lens, and a fourth positive lens which are arranged in this order from the magnification side. The first lens is an aspheric lens made of plastic. The wide-angle projection zoom lens satisfies the following Conditional expressions 1 to 4:

| | |
|---|---|
| $1.6 < Bf/f_w < 2.6$; | [Conditional expression 1] |
| $1.5 < |f_1/f_w| < 4.5$; | [Conditional expression 2] |
| $0.35 < D_2/f_w$; and | [Conditional expression 3] |
| $2.0 < L_s/f_w < 3.0$ | [Conditional expression 4] |

(where Bf indicates a back focal length, $f_w$ indicates the focal length of the entire system at the wide angle end, $f_1$ indicates the focal length of the first lens group, $D_2$ indicates the distance between a reduction-side surface of the first lens and a magnification-side surface of the second lens on the optical axis in the first lens group, and $L_s$ indicates the distance from a magnification-side surface of the first lens to a magnification side pupil position at the wide angle end).

The second lens group may include one or two positive lenses.

The third lens group may include one negative lens and one positive lens which are arranged in this order from the magnification side. A reduction-side surface of the one negative lens may be a concave surface, and a magnification-side surface of the one positive lens may be a convex surface. The fourth lens group may include a negative meniscus lens having a convex surface facing the magnification side, a cemented lens having a concave cemented surface facing the magnification side, and a positive lens which are arranged in this order from the magnification side.

The third lens group may include one negative lens and one positive lens which are arranged in this order from the magnification side. A magnification-side surface of the one negative lens may be a concave surface, and a reduction-side surface of the one positive lens may be a convex surface. The fourth lens group may include a negative meniscus lens having a convex surface facing the magnification side, a cemented lens having a concave cemented surface facing the reduction side, and a positive lens which are arranged in this order from the magnification side.

The entire first lens group may be moved to perform focusing while changing a gap between the third lens and the fourth lens in the first lens group.

A cover glass may be provided on the magnification side of the first lens group.

According to another aspect of the invention, a projection display device includes: a light source; a light valve; an illumination optical unit that guides light emitted from the light source to the light valve; and the wide-angle projection zoom lens according to the above-mentioned aspect. The light valve modulates the light emitted from the light source, and the modulated light is projected onto a screen by the wide-angle projection zoom lens.

The 'magnification side' means an object side (screen side). In the case of reduced projection, for convenience, the screen side is also referred to as the magnification side. The 'reduction side' means an original image display area side (light valve side). In the case of reduced projection, for convenience, the light valve side is also referred to as the reduction side.

The positive and negative refractive powers of the aspheric lens mean the positive and negative refractive powers on the optical axis.

The wide-angle projection zoom lens according to the above-mentioned aspect includes five lens groups with negative, positive, negative, positive, and positive refractive powers which are arranged in this order from the magnification side, and the reduction side has telecentricity. During zooming from the wide angle end to the telephoto end, the first lens group and the fifth lens group are fixed, and the second to fourth lens groups are moved to the magnification side in the optical axis direction while changing the gaps therebetween.

The first lens group includes the first negative lens, the second negative lens, the third negative lens, and the fourth positive lens which are arranged in this order from the magnification side. The first lens is an aspheric lens made of plastic. The wide-angle projection zoom lens satisfies the above-mentioned Conditional expressions 1 to 4.

According to this structure, it is possible to achieve a fast wide-angle projection zoom lens that has a small size and a wide angle of view and can maintain a good optical performance and a projection display device including the wide-angle projection zoom lens.

In particular, the first negative lens closest to the magnification side in the first lens group is an aspheric lens, and the gap between the aspheric lens and the second lens arranged on the reduction side of the aspheric lens is increased such that Conditional expression 2 is satisfied. In this way, it is possible to effectively correct the various aberrations including, for example, distortion and field curvature.

BRIEF DESCRIPTION OF THE DRAWINGS

FIG. 10 is a diagram illustrating various aberrations of the wide-angle projection zoom lens according to Example 2 at the wide angle end (WIDE), the middle position (MIDDLE), and the telephoto end (TELE);

DESCRIPTION OF THE PREFERRED EMBODIMENTS

Figure 1:
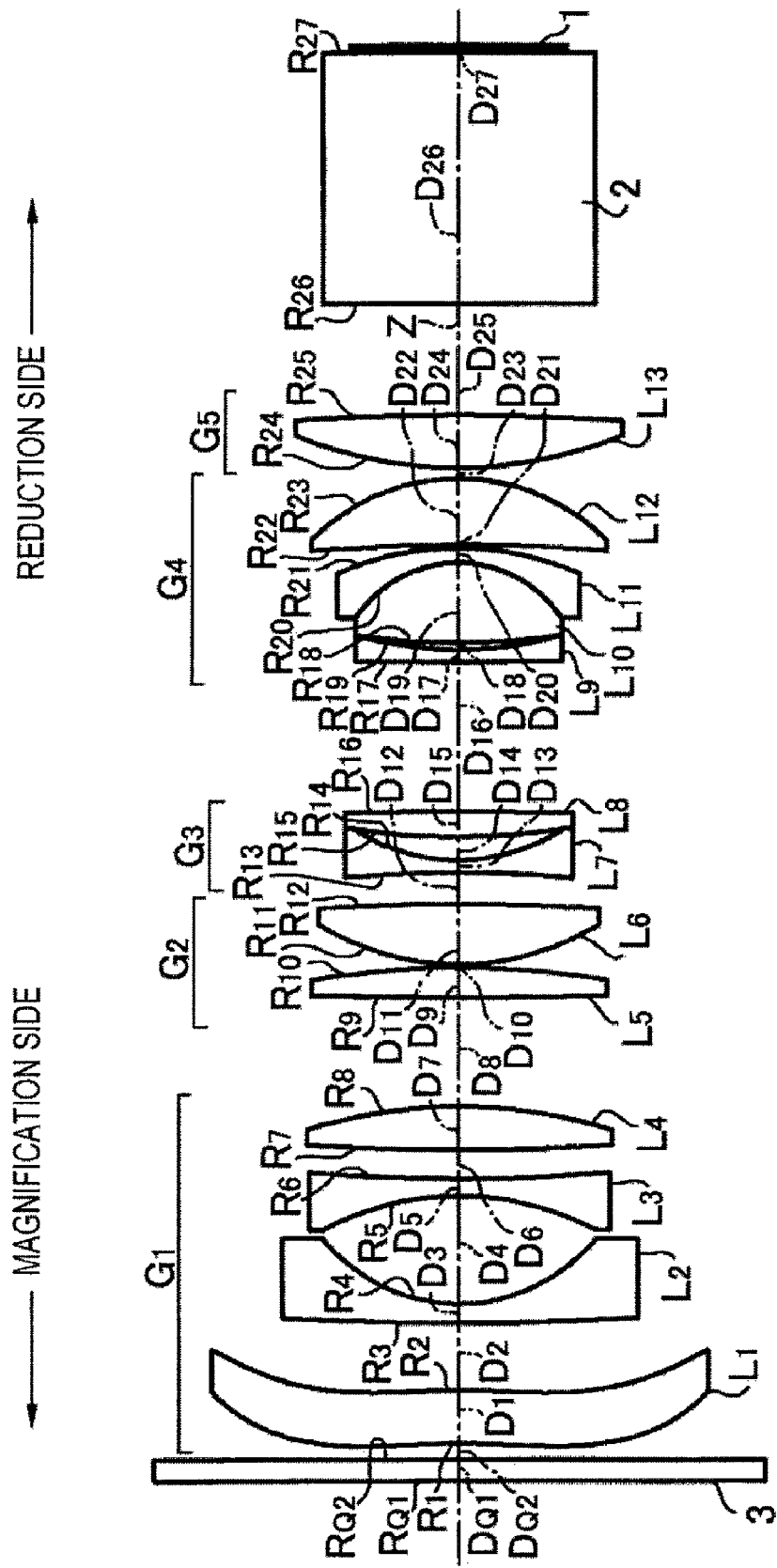
FIG. 1 is a diagram illustrating the detailed structure of a wide-angle projection zoom lens according to Example 1.
Figure 2:
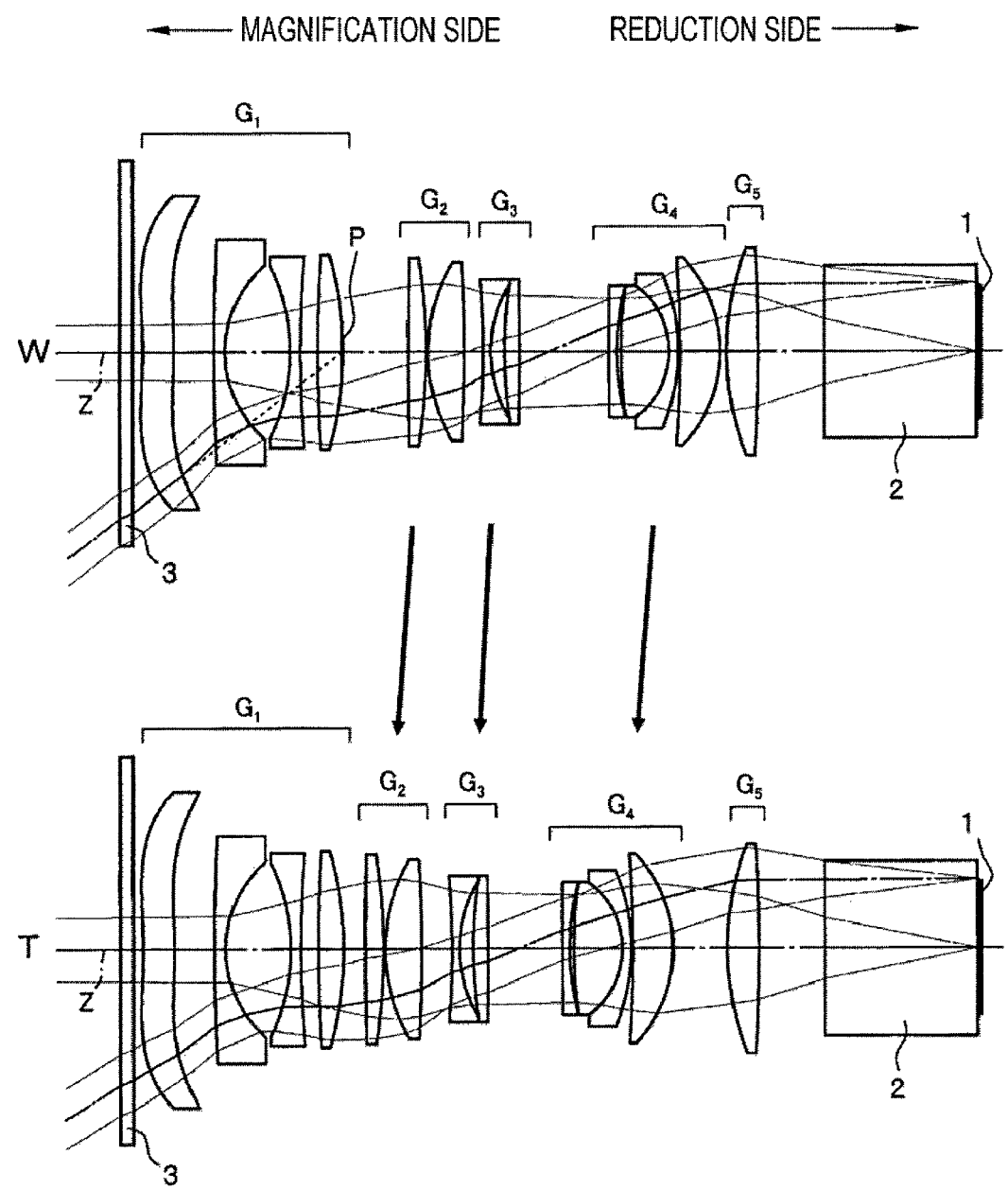
FIG. 2 is a diagram illustrating the trajectory of light beams and the movement of each lens group at a wide angle end (WIDE) and a telephoto end (TELE) of the wide-angle projection zoom lens according to Example 1.

Hereinafter, exemplary embodiments of the invention will be described with reference to the accompanying drawings. A lens according to the following Example 1 will be described as a representative example of this embodiment with reference to FIGS. 1 and 2 showing the structure of the lens. In the drawings, Z indicates an optical axis, and P indicates a magnification side pupil position at a wide angle end.

As shown in FIG. 1, a wide-angle projection zoom lens according to this embodiment includes a first lens group $G_1$ with a negative refractive power, a second lens group $G_2$ with a positive refractive power, a third lens group $G_3$ with a negative refractive power, a fourth lens group $G_4$ with a positive refractive power, and a fifth lens group $G_5$ with a positive refractive power which are arranged in this order from the magnification side (screen side), and a reduction side has telecentricity.

The first lens group $G_1$ with a negative refractive power is arranged on the magnification side and the fifth lens group $G_5$ with a positive refractive power is arranged on the reduction side. In this way, it is possible to obtain a long back focal length while obtaining a telecentric reduction side.

As shown in FIG. 2, in the wide-angle projection zoom lens according to this embodiment, during zooming from the wide angle end to the telephoto end, the first lens group $G_1$ and the fifth lens group $G_5$ are fixed, and the second lens group $G_2$, the third lens group $G_3$, and the fourth lens group $G_4$ are independently moved to the magnification side on the optical axis Z while changing the gaps therebetween. That is, the second lens group $G_2$, the third lens group $G_3$, and the fourth lens group $G_4$ are moving lens groups during zooming.

In the wide-angle projection zoom lens according to this embodiment shown in FIG. 1, a light beam that is incident from the right side of the plane of FIG. 1 and is then given image information from an image display surface 1 of a light valve is incident on the wide-angle projection zoom lens through a glass block 2 and is then enlarged and projected onto a screen in the left direction of the plane of FIG. 1 by the wide-angle projection zoom lens. In FIG. 1, for ease of illustration, only the image display surface 1 of one light valve is shown. However, in a projection display device, a color separation optical system separates light beams emitted from a light source into three primary color light beams, and three light valves corresponding to the three primary color light beams are provided. In this way, it is possible to display a full color image (see FIG. 13). A color composition unit, such as a cross dichroic prism, may be provided at the position of the glass block 2 to compose the three primary color light beams.

In the wide-angle projection zoom lens according to this embodiment, the first lens group $G_1$ includes four negative, negative, negative, and positive lenses (first to fourth lenses $L_1$ to $L_4$) arranged in this order from the magnification side. The first lens $L_1$ closest to the magnification side is an aspheric lens made of plastic and the wide-angle projection zoom lens is configured so as to satisfy the following Conditional expressions 1 to 4:

$1.6 < Bf/f_w < 2.6$;  [Conditional expression 1]

$1.5 < |f_1/f_w| < 4.5$;  [Conditional expression 2]

$0.35 < D_2/f_w$; and  [Conditional expression 3]

$2.0 < L_s/f_w < 3.0$  [Conditional expression 4]

(where Bf indicates a back focal length, $f_w$ indicates the focal length of the entire system at the wide angle end, $f_1$ indicates the focal length of the first lens group, $D_2$ indicates the distance between a reduction-side surface of the first lens and a magnification-side surface of the second lens on the optical axis in the first lens group, and $L_s$ indicates the distance from a magnification-side surface of the first lens to a magnification side pupil position at the wide angle end).

An aspheric shape is represented by the following aspheric expression.

$$Z = \frac{Y^2/R}{1 + \sqrt{1 - K \times Y^2/R^2}} + \sum_{i=2}^{7} A_{2i} Y^{2i}$$  [Expression 1]

(where Z indicates the length of a perpendicular line that drops from a point on an aspheric surface at a distance Y from the optical axis to a tangent plane to the top of the aspheric surface (a plane vertical to the optical axis), Y indicates the distance from the optical axis, R indicates the curvature radius of an aspheric surface near the optical axis, K indicates eccentricity, and $A_{2i}$ indicates an aspheric coefficient (i=2 to 7)).

The first lens $L_1$ that is arranged closest to the magnification side in the first lens group $G_1$ is an aspheric lens. Therefore, it is possible to effectively correct various aberrations in the periphery of an image, which particularly occur when the angle of view is increased, using the first lens $L_1$. Since Conditional expression 3 is satisfied, it is possible to increase the gap between the first lens $L_1$ and the second lens $L_2$ to improve the effect of correcting aberration using the first lens $L_1$. If the ratio is less than the lower limit of Conditional expression 3, it is difficult to sufficiently obtain the effect of correcting aberration using the first lens $L_1$. Since the first lens $L_1$ with the largest diameter is made of plastic, it is possible to reduce the weight of the wide-angle projection zoom lens.

When the wide-angle projection zoom lens is configured so as to satisfy Conditional expression 3, there is a concern that the total length of the first lens group $G_1$ will increase and the diameter of the first lens $L_1$ will increase. Therefore, the wide-angle projection zoom lens is configured such that the second to fourth lenses $L_2$ to $L_4$ have negative, negative, and positive refractive powers and Conditional expressions 2 and 4 are satisfied. In this way, it is possible to prevent an increase in the total length of the first lens group $G_1$ and an increase in the diameter of the first lens $L_1$.

If the absolute value is less than the lower limit of Conditional expression 2, it is possible to reduce the diameter of the first lens $L_1$, but field curvature and astigmatism increase. If the absolute value is more than the upper limit, it is possible to reduce the field curvature and astigmatism, but the diameter of the first lens $L_1$ increases. If the ratio is less than the lower limit of Conditional expression 4, the diameter of the first lens $L_1$ with respect to an image size is too small. If the ratio is more than the upper limit, the diameter of the first lens $L_1$ with respect to an image size is too large.

Conditional expression 1 is set considering the balance between the securing of an appropriate back focal length and the effective correction of aberration. If the ratio is less than the lower limit of Conditional expression 1, the back focal length is reduced, and it is difficult to arrange optical members, such as a color composition prism and a filter, or it is difficult to provide a sufficient air space for cooling. On the other hand, if the ratio is more than the upper limit, the back focal length increases, which results in an increase in the total length of the entire system and the diameter of the lens. Therefore, in order to maintain a high optical performance, it is necessary to increase the number of lenses or material costs.

It is preferable that the wide-angle projection zoom lens satisfy the following Conditional expressions 1A to 4A, instead of Conditional expressions 1 to 4:

$1.7 < Bf/f_w < 2.5$;  [Conditional expression 1A]

$1.7 < |f_1/f_w| < 4.2$;  [Conditional expression 2A]

$0.40 < D_2/f_w < 0.70$; and  [Conditional expression 3A]

$2.2 < L_s/f_w < 2.7$.  [Conditional expression 4A]

In particular, since the wide-angle projection zoom lens is set such that the ratio is less than the upper limit of Conditional expression 3A, it is possible to more effectively prevent an increase in the total length of the first lens group $G_1$ and an increase in the diameter of the first lens $L_1$.

In the wide-angle projection zoom lens according to this embodiment, the second lens group $G_2$ includes two positive lenses (a fifth lens $L_5$ and a sixth lens $L_6$). Therefore, it is possible to effectively ensure the speed of the lens and reduce various kinds of aberrations while using a small number of lenses. As in the following Examples 3 and 4, the second lens group $G_2$ may include one positive lens (fifth lens $L_5$). In this case, it is possible to obtain the same effects as described above.

In the wide-angle projection zoom lens according to this embodiment, the third lens group $G_3$ includes one negative lens (seventh lens $L_7$) having a concave surface on the reduction side and one positive lens (eighth lens $L_8$) having a convex surface on the magnification side which are arranged in this order from the magnification side. The fourth lens group $G_4$ includes a negative meniscus lens (ninth lens $L_9$) having a convex surface facing the magnification side and a cemented lens (a cemented lens of a tenth lens $L_{10}$ and an eleventh lens $L_{11}$) having a concave cemented surface facing the magnification side, and a positive lens (twelfth lens $L_{12}$)

which are arranged in this order from the magnification side. The fifth lens group $G_5$ includes one positive lens (thirteenth lens $L_{13}$).

According to the third lens group $G_3$ and the fourth lens group $G_4$ having the above-mentioned structure, it is possible to obtain the following operation and effects. That is, in the wide-angle projection zoom lens according to this embodiment, as described above, in order to ensure the telecentricity of the reduction side and a long back focal length, the first lens group $G_1$ with a negative refractive power is arranged on the magnification side and the fifth lens group $G_5$ with a positive refractive power is arranged on the reduction side. However, in this case, the diameter of an on-axis light beam tends to increase on the reduction side. When a high speed of F1.6 is obtained, the tendency becomes remarkable. In this case, the problem is a variation in the various aberrations with the movement of a moving group (particularly, the fourth lens group $G_4$) during zooming. The above-described structure of the third lens group $G_3$ and the fourth lens group $G_4$ is for solving this problem, and it is possible to effectively correct various aberrations over the entire zoom range without arranging any aspheric lens in the third lens group $G_3$ and the fourth lens group $G_4$.

Instead of the structure of the third lens group $G_3$ and the fourth lens group $G_4$, the structure according to the following Examples 3 and 4 may be used in which the third lens group $G_3$ includes one negative lens (sixth lens $L_6$) having a concave surface on the magnification side and one positive lens (seventh lens $L_7$) having a convex surface on the reduction side which are arranged in this order from the magnification side and the fourth lens group $G_4$ includes a negative meniscus lens (eighth lens $L_8$) having a convex surface facing the magnification side, a cemented lens (a cemented lens of a ninth lens $L_9$ and a tenth lens $L_{10}$) having a concave cemented surface facing the reduction side, and a positive lens (eleventh lens $L_{11}$), which are arranged in this order from the magnification side. In this case, it is possible to obtain the same effects as described above.

As described above, the fourth lens group $G_4$ includes the cemented lens. Therefore, in particular, it is possible to effectively correct chromatic aberration. When the position where the diameter of a light beam is reduced is in the vicinity of the cemented surface, there is a concern that a defect will occur in a cemented portion due to the influence of heat (for example, the peeling-off of an adhesive). In this embodiment, the intersection position of a principal ray is closer to the magnification side than the fourth lens group $G_4$. Therefore, it is possible to prevent the occurrence of the defect in the cemented surface.

As described above, the fifth lens group $G_5$ includes one positive lens. It is possible to simplify the structure.

The wide-angle projection zoom lens according to this embodiment is configured such that the entire first lens group $G_1$ is moved to perform focusing while changing the gap between the third lens $L_3$ and the fourth lens $L_4$ in the first lens group $G_1$. In this way, it is possible to widen the range in which focusing can be adjusted. In addition, the entire first lens group $G_1$ may be moved or only some lenses (for example, the fourth lens $L_4$) in the first lens group $G_1$ may be moved to perform focusing.

In the wide-angle projection zoom lens according to this embodiment, a cover glass 3 is provided on the magnification side of the first lens group $G_1$. In this way, it is possible to protect the first lens $L_1$ that is likely to be scratched since it is made of plastic. The cover glass 3 may not be provided.

According to the wide-angle projection zoom lens of this embodiment having the above-mentioned structure, it is possible to obtain a high speed of F1.6 and an angle of view of more than 70 degrees at the wide angle end while ensuring the telecentricity of the reduction side and a long back focal length. In addition, it is possible to obtain a high optical performance over the entire zoom range and reduce the size of the wide-angle projection zoom lens.

Figure 13:
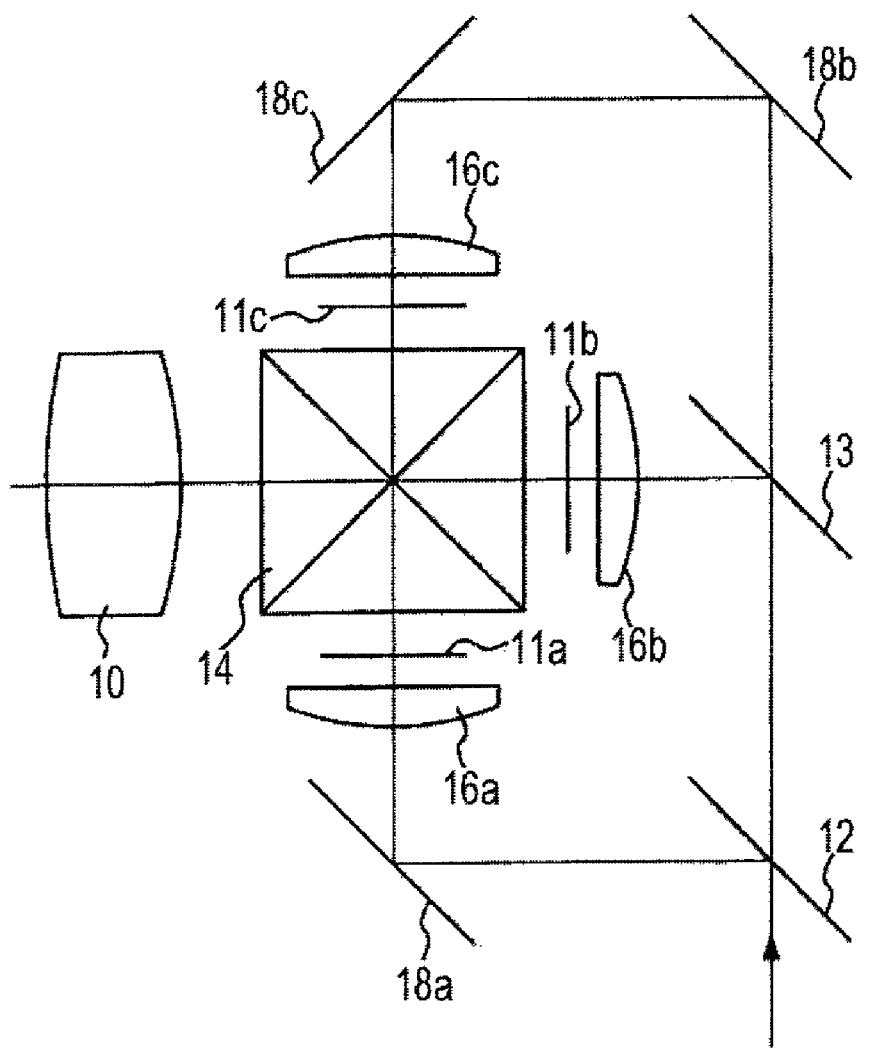
FIG. 13 is a diagram schematically illustrating the structure of a projection display device according to an embodiment of the invention.

Next, an example of a projection display device including the wide-angle projection zoom lens will be described with reference to FIG. 13. The projection display device shown in FIG. 13 includes transmissive liquid crystal panels 11a to 11c as light valves and uses the wide-angle projection zoom lens according to the above-described embodiment as a wide-angle projection zoom lens 10. Components between a light source 20 and a dichroic mirror 12 are not shown. White light emitted from the light source 20 is incident on the transmissive liquid crystal panels 11a to 11c corresponding to three color light beams (G light, B light, and R light) through an illumination optical unit and then modulated. The modulated light components are composed by a cross dichroic prism 14, and the composed light is projected onto a screen (not shown) by the wide-angle projection zoom lens 10. This device includes the dichroic mirrors 12 and 13 for color separation, the cross dichroic prism 14 for color composition, condenser lenses 16a to 16c, and total reflecting mirrors 18a to 18c.

The projection display device according to this embodiment uses the wide-angle projection zoom lens according to the above-described embodiment. Therefore, it is possible to obtain a high speed of F1.6 and an angle of view of more than 70 degrees at the wide angle end and reduce the size of the device while maintaining the zoom function. Therefore, it is possible to significantly improve the portability or the use convenience of the device.

In the above-described embodiment, the wide-angle projection zoom lens is used as the projection lens of the projection display device using the liquid crystal display panels, but the invention is not limited thereto. For example, the wide-angle projection zoom lens may be used as wide-angle projection zoom lenses of other light modulating units, such as DMDs.

EXAMPLES

Next, detailed examples of the wide-angle projection zoom lens according to the invention will be described. In FIGS. 3 to 8 showing the structures of Examples 2 to 4, members having the same operation and effects as those in Example 1 are denoted by the same reference numerals as those in FIGS. 1 and 2.

Example 1

Figure 9:
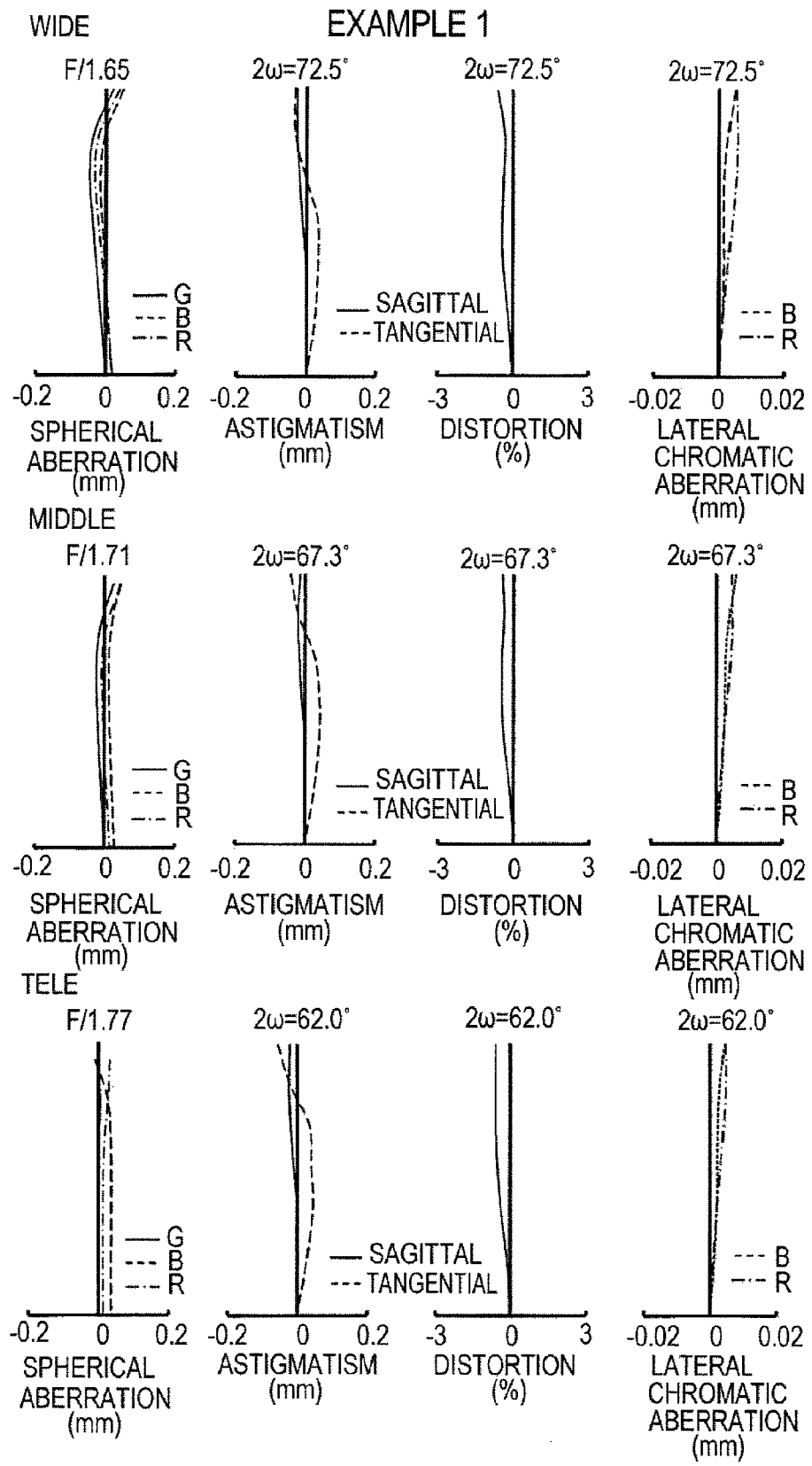
FIG. 9 is a diagram illustrating various aberrations of the wide-angle projection zoom lens according to Example 1 at the wide angle end (WIDE), the middle position (MIDDLE), and the telephoto end (TELE)

A wide-angle projection zoom lens according to Example 1 will be described with reference to FIGS. 1 and 2 showing the structure of the lens and FIG. 9 showing the various aberrations. As described above, the wide-angle projection zoom lens according to Example 1 includes a first lens group $G_1$ with a negative refractive power, second lens group $G_2$ with a positive refractive power, a third lens group $G_3$ with a negative refractive power, a fourth lens group $G_4$ with a positive refractive power, and a fifth lens group $G_5$ with a positive refractive power which are arranged in this order from a magnification side. A reduction side has telecentricity. In addition, a glass block 2, which is mainly a color composition prism, and an image display surface 1 are provided on the reduction side, and a cover glass 3 is provided on the magnification side.

During zooming from the wide angle end to the telephoto end, the first lens group $G_1$ and the fifth lens group $G_5$ are fixed, and the second lens group $G_2$, the third lens group $G_3$, and the fourth lens group $G_4$ are independently moved to the magnification side on the optical axis Z while changing the gaps therebetween.

The first lens group $G_1$ includes a first lens $L_1$ which is an aspheric lens made of plastic and has a negative refractive power on the optical axis Z, a second lens $L_2$, which is a negative meniscus lens having a concave surface facing the reduction side, a third lens $L_3$, which is a biconcave lens, and a fourth lens $L_4$, which is a biconvex lens. The first to fourth lenses are arranged in this order from the magnification side. The entire first lens group $G_1$ is moved to perform focusing while changing the gap between the third lens $L_3$ and the fourth lens $L_4$.

The second lens group $G_2$ includes two positive biconvex lenses, that is, a fifth lens $L_5$ and a sixth lens $L_6$. The third lens group $G_3$ includes a seventh lens $L_7$, which is a biconcave lens, and an eighth lens $L_8$, which is a biconvex lens, arranged in this order from the magnification side.

The fourth lens group $G_4$ includes a ninth lens $L_9$, which is a negative meniscus lens having a convex surface facing the magnification side, a cemented lens (having a concave cemented surface facing the magnification side) of a tenth lens $L_{10}$, which is a biconvex lens, and an eleventh lens $L_{11}$, which is a negative meniscus lens having a concave surface facing the magnification side, and a twelfth lens $L_{12}$, which is a positive meniscus lens having a convex surface facing the reduction side, which are arranged in this order from the magnification side. The fifth lens group $G_5$ includes only a thirteenth lens $L_{13}$ which is a biconvex lens.

In Table 1, an upper part shows the focal length of the entire system from the wide angle end to the telephoto end, the angle of view at the wide angle end, and the speed (F number) of the entire system from the wide angle end to the telephoto end in Example 1.

In Table 1, a middle part shows the curvature radius R of each lens surface, the thickness of the center of each lens and an air space D between the lenses, and the refractive index $N_d$ and the Abbe number $v_d$ of each lens with respect to the d-line. In Table 1 and Tables 2 to 4, which will be described below, numbers corresponding to R, D, $N_d$, and $v_d$ are sequentially increased from the magnification side. However, Q1 and Q2 are given to the cover glass 3 in order to discriminate the cover glass from other lenses.

In Table 1, a lower part shows the distance $D_8$ (variable 1) between the first lens group $G_1$ and the second lens group $G_2$, the distance $D_{12}$ (variable 2) between the second lens group $G_2$ and the third lens group $G_3$, the distance $D_{16}$ (variable 3) between the third lens group $G_3$ and the fourth lens group $G_4$, and the distance $D_{23}$ (variable 4) between the fourth lens group $G_4$ and the fifth lens group $G_5$ at the wide angle end (wide), the middle position (middle), and the telephoto end (tele).

TABLE 1

Focal length: 14.28-17.42, Angle of view: 72.5 degrees, Speed: F1.65-1.77

| Surface number | R | D | $N_d$ | $v_d$ |
|---|---|---|---|---|
| Q1 | ∞ | 2.00 | 1.5240 | 59.8 |
| Q2 | ∞ | 1.50 | | |
| 1* | −70.707 | 5.00 | 1.4910 | 57.5 |
| 2* | −83.124 | 6.32 | | |
| 3 | 315.610 | 1.80 | 1.6889 | 31.1 |
| 4 | 17.148 | 10.33 | | |
| 5 | −27.985 | 1.60 | 1.4875 | 70.2 |
| 6 | 161.903 | 2.72 | | |
| 7 | 218.885 | 4.09 | 1.7283 | 28.5 |
| 8 | −51.471 | **(Variable 1) | | |
| 9 | 526.862 | 2.88 | 1.7725 | 49.6 |
| 10 | −85.200 | 0.30 | | |
| 11 | 25.839 | 5.79 | 1.7130 | 53.9 |
| 12 | −231.803 | **(Variable 2) | | |
| 13 | −126.731 | 1.20 | 1.5891 | 61.2 |
| 14 | 19.129 | 2.17 | | |
| 15 | 65.605 | 2.42 | 1.6700 | 47.3 |
| 16 | −1383.118 | **(Variable 3) | | |
| 17 | 558.646 | 1.20 | 1.8467 | 23.8 |
| 18 | 36.017 | 0.67 | | |
| 19 | 71.657 | 7.69 | 1.4875 | 70.2 |
| 20 | −12.040 | 1.40 | 1.8061 | 33.3 |
| 21 | −29.443 | 0.30 | | |
| 22 | −183.214 | 6.39 | 1.4875 | 70.2 |
| 23 | −20.116 | **(Variable 4) | | |
| 24 | 41.693 | 5.02 | 1.7130 | 53.9 |
| 25 | −242.945 | 10.50 | | |
| 26 | ∞ | 24.10 | 1.5163 | 64.1 |
| 27 | ∞ | 0.17 | | |

*Aspheric coefficient

| Surface number | K | $A_4$ | $A_6$ | $A_8$ |
|---|---|---|---|---|
| First surface | −8.749610 | 4.098289E−05 | −9.152886E−08 | 1.894436E−10 |
| Second surface | −59.453346 | 4.047193E−05 | −8.303816E−08 | 1.652156E−10 |

| Surface number | $A_{10}$ | $A_{12}$ | $A_{14}$ |
|---|---|---|---|
| First surface | −2.676731E−13 | 2.413109E−16 | −1.001205E−19 |
| Second surface | −3.106593E−13 | 4.577630E−16 | −3.228641E−19 |

| | Wide | Middle | Tele |
|---|---|---|---|
| $D_8$ (Variable 1) | 10.40 | 6.90 | 3.46 |
| $D_{12}$ (Variable 2) | 3.03 | 3.83 | 4.88 |
| $D_{16}$ (Variable 2) | 14.26 | 13.39 | 11.76 |
| $D_{23}$ (Variable 4) | 1.00 | 4.57 | 8.60 |

*Aspheric surface
**Variable spacing

In addition, Table 5 shows numerical values corresponding to the conditional expressions according to Example 1. As shown in Table 5, the wide-angle projection zoom lens according to Example 1 satisfies all of Conditional expressions 1 to 4, and Conditional expressions 1A to 4A.

In FIG. 9 and FIGS. 10 to 12, which will be described below, each spherical aberration diagram shows aberration curves with respect to the wavelength of G (green), B (blue), and R (red) light components, and each lateral chromatic aberration diagram shows the aberration curves of B and R light components with respect to G light.

As can be seen from Table 1 and FIG. 9, according to the wide-angle projection zoom lens of Example 1, aberration is effectively corrected over the entire zoom range, and an appropriate back focal length and high telecentricity on the reduction side are obtained. In addition, it is possible to obtain performances, such as a high speed, a small size, a wide angle of view, and a high zoom ratio, with the best balance therebetween. In particular, it is possible to obtain a high speed of F1.65 and an angle of view 2ω of 72.5 degrees at the wide angle end. Therefore, it is possible to achieve a fast lens with a wide angle of view.

Example 2

Figure 3:
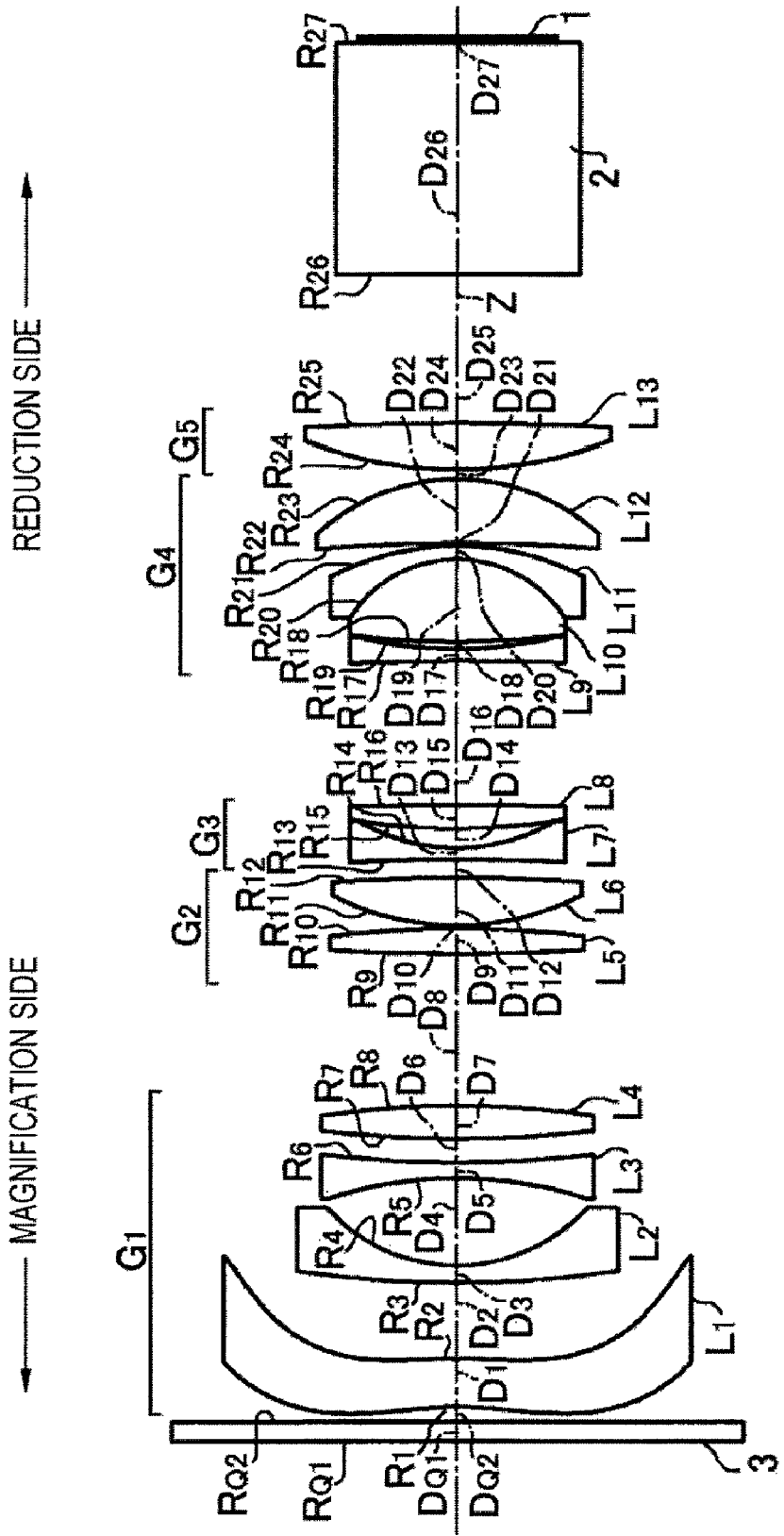
FIG. 3 is a diagram illustrating the detailed structure of a wide-angle projection zoom lens according to Example 2.
Figure 4:
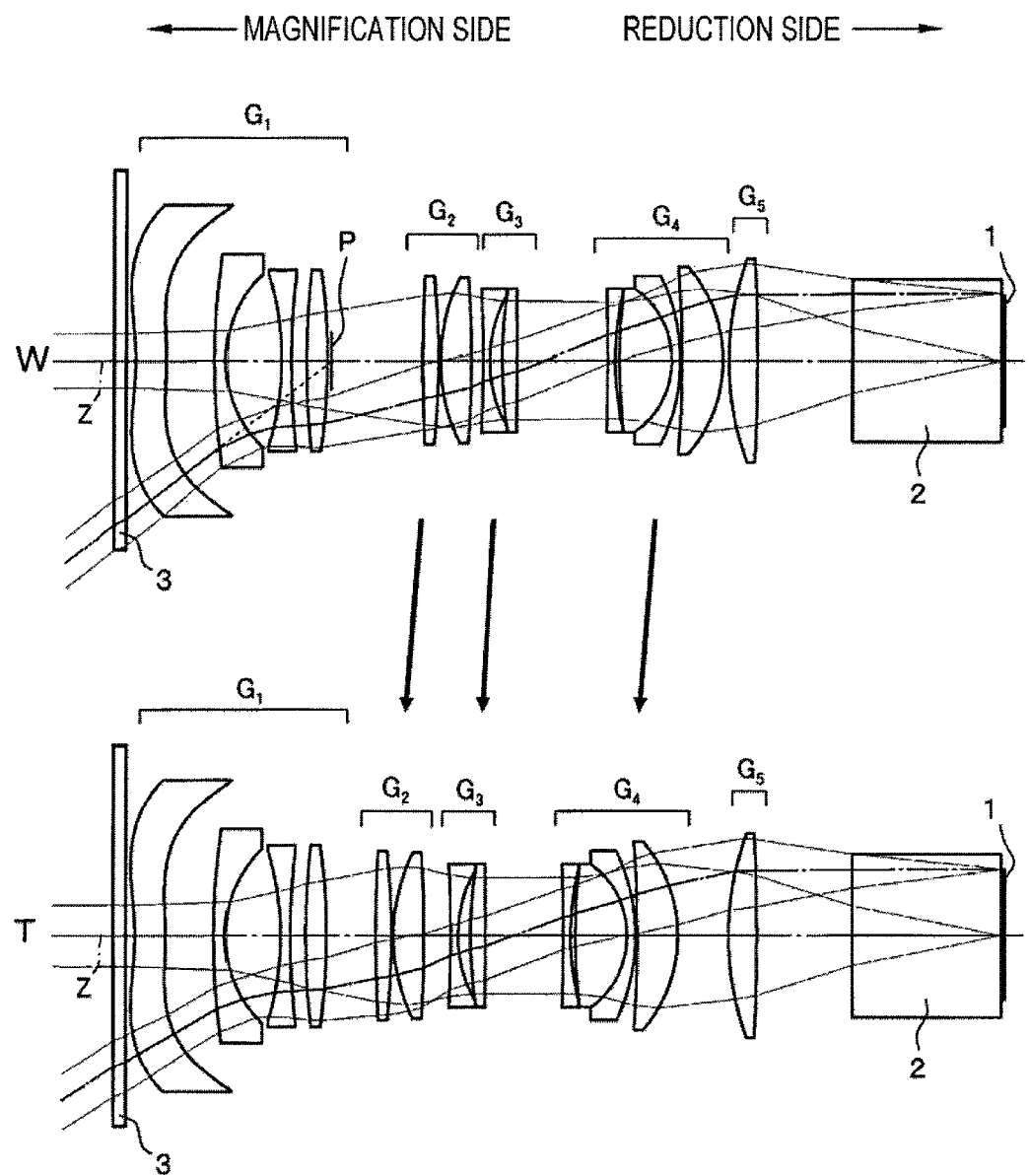
FIG. 4 is a diagram illustrating the trajectory of light beams and the movement of each lens group at the wide angle end (WIDE) and the telephoto end (TELE) of the wide-angle projection zoom lens according to Example 2.

A wide-angle projection zoom lens according to Example 2 will be described with reference to FIGS. 3 and 4 showing the structure of the lens and FIG. 10 showing the various aberrations. As shown in FIG. 3, the wide-angle projection zoom lens according to Example 2 has the same basic structure as that according to Example 1 except that the ninth lens $L_9$ in the fourth lens group $G_4$ is a biconcave lens.

As shown in FIG. 4, when power varies, the first lens group $G_1$ and the fifth lens group $G_5$ are fixed and the second to fourth lens groups $G_2$ to $G_4$ are moved during zooming.

In Table 2, an upper part shows the focal length of the entire system from the wide angle end to the telephoto end, the angle of view at the wide angle end, and the speed (F number) of the entire system from the wide angle end to the telephoto end in Example 2.

In Table 2, a middle part shows the curvature radius R of each lens surface, the thickness of the center of each lens and the air space D between the lenses, and the refractive index $N_d$ and the Abbe number $v_d$ of each lens with respect to the d-line.

In Table 2, a lower part shows the distance $D_8$ (variable 1) between the first lens group $G_1$ and the second lens group $G_2$, the distance $D_{12}$ (variable 2) between the second lens group $G_2$ and the third lens group $G_3$, the distance $D_{16}$ (variable 3) between the third lens group $G_3$ and the fourth lens group $G_4$, and the distance $D_{23}$ (variable 4) between the fourth lens group $G_4$ and the fifth lens group $G_5$ at the wide angle end (wide), the middle position (middle), and the telephoto end (tele).

TABLE 2

Focal length: 14.00-17.08, Angle of view: 73.5 degrees, Speed: F1.63-1.72

| Surface number | R | D | $N_d$ | $v_d$ |
|---|---|---|---|---|
| Q1 | ∞ | 2.00 | 1.5240 | 59.8 |
| Q2 | ∞ | 1.50 | | |
| 1* | −36.855 | 5.00 | 1.4910 | 57.5 |
| 2* | −72.883 | 7.88 | | |
| 3 | 115.246 | 1.80 | 1.6398 | 34.5 |
| 4 | 18.467 | 9.09 | | |
| 5 | −43.420 | 1.60 | 1.4875 | 70.2 |
| 6 | 118.859 | 2.45 | | |
| 7 | 120.934 | 3.42 | 1.8467 | 23.8 |
| 8 | −98.434 | **(Variable 1) | | |
| 9 | 216.142 | 2.64 | 1.4875 | 70.2 |
| 10 | −115.455 | 0.30 | | |
| 11 | 28.343 | 5.04 | 1.7130 | 53.9 |
| 12 | −186.288 | **(Variable 2) | | |
| 13 | −196.959 | 1.20 | 1.6030 | 65.5 |
| 14 | 20.414 | 1.99 | | |
| 15 | 68.664 | 2.46 | 1.7495 | 35.3 |
| 16 | −670.398 | **(Variable 3) | | |
| 17 | −309.680 | 1.20 | 1.8467 | 23.8 |
| 18 | 41.768 | 0.79 | | |
| 19 | 93.089 | 8.65 | 1.4970 | 81.6 |
| 20 | −13.380 | 1.40 | 1.8340 | 37.2 |
| 21 | −29.009 | 0.30 | | |
| 22 | −176.416 | 6.68 | 1.4875 | 70.2 |
| 23 | −21.869 | **(Variable 4) | | |
| 24 | 44.732 | 4.74 | 1.7130 | 53.9 |
| 25 | −306.885 | 15.50 | | |
| 26 | ∞ | 24.10 | 1.5163 | 64.1 |
| 27 | ∞ | 0.10 | | |

TABLE 2-continued

Focal length: 14.00-17.08, Angle of view: 73.5 degrees, Speed: F1.63-1.72

*Aspheric coefficient

| Surface number | K | $A_4$ | $A_6$ | $A_8$ |
|---|---|---|---|---|
| First surface | −15.509394 | 5.109214E−05 | −1.177237E−07 | 2.467183E−10 |
| Second surface | −67.411162 | 6.708240E−05 | −1.344810E−07 | 2.867155E−10 |

| Surface number | $A_{10}$ | $A_{12}$ | $A_{14}$ |
|---|---|---|---|
| First surface | −3.375921E−13 | 2.795678E−16 | −9.641889E−20 |
| Second surface | −4.646286E−13 | 6.840195E−16 | −5.411548E−19 |

| | Wide | Middle | Tele |
|---|---|---|---|
| $D_8$ (Variable 1) | 15.75 | 11.91 | 8.14 |
| $D_{12}$ (Variable 2) | 1.91 | 2.99 | 4.34 |
| $D_{16}$ (Variable 2) | 14.93 | 14.31 | 12.85 |
| $D_{23}$ (Variable 4) | 1.00 | 4.39 | 8.26 |

*Aspheric surface
**Variable spacing

In addition, Table 5 shows numerical values corresponding to the conditional expressions according to Example 2. As shown in Table 5, the wide-angle projection zoom lens according to Example 2 satisfies all of Conditional expressions 1 to 4, and Conditional expressions 1A to 4A.

As can be seen from Table 2 and FIG. 10, according to the wide-angle projection zoom lens of Example 2, aberration is effectively corrected over the entire zoom range, and an appropriate back focal length and high telecentricity on the reduction side are obtained. In addition, it is possible to obtain performances, such as a high speed, a small size, a wide angle of view, and a high zoom ratio, with the best balance therebetween. In particular, it is possible to obtain a high speed of F1.63 and an angle of view 2ω of 73.5 degrees at the wide angle end. Therefore, it is possible to achieve a fast lens with a wide angle of view.

Example 3

Figure 5:
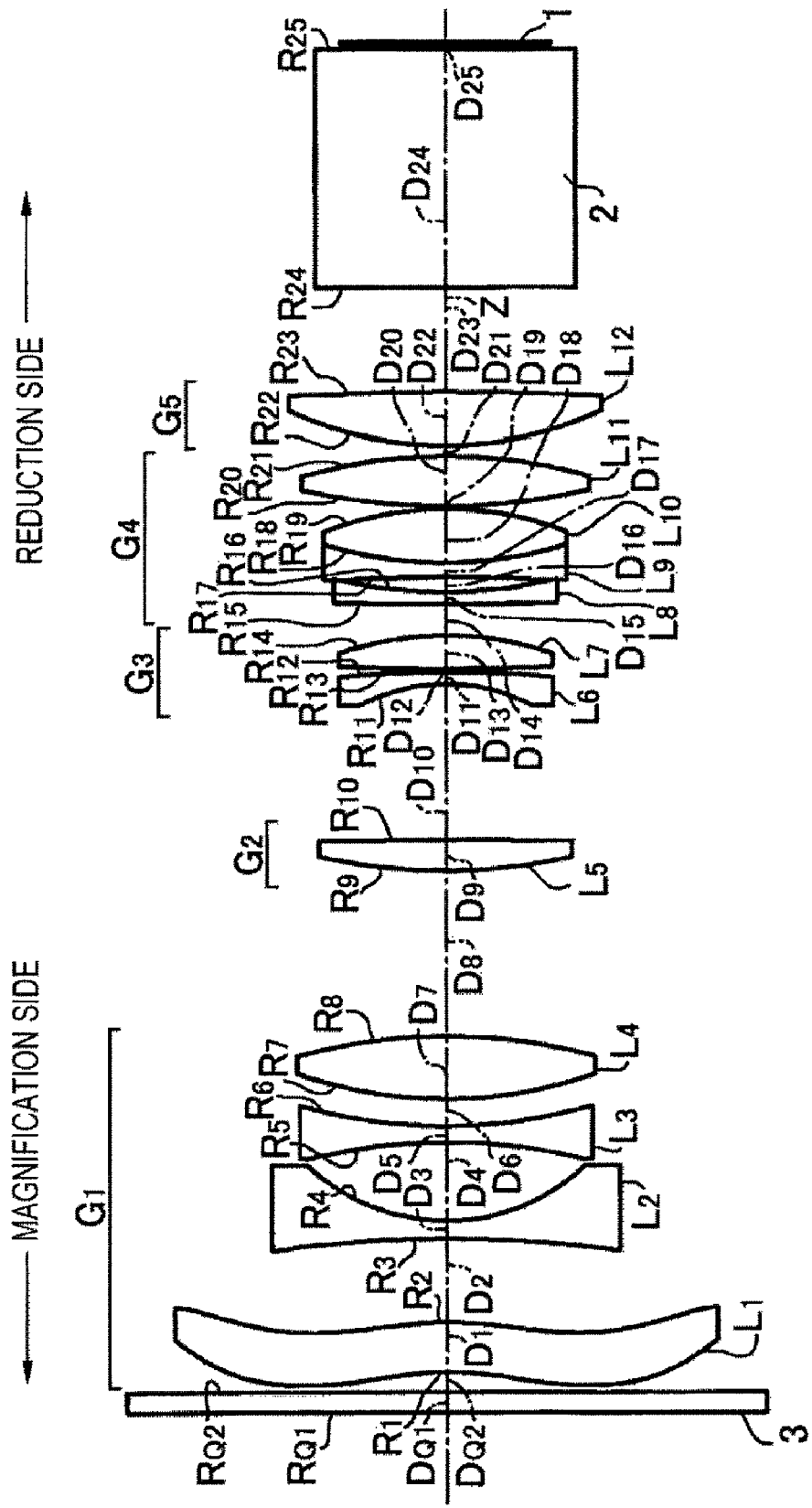
FIG. 5 is a diagram illustrating the detailed structure of a wide-angle projection zoom lens according to Example 3.
Figure 6:
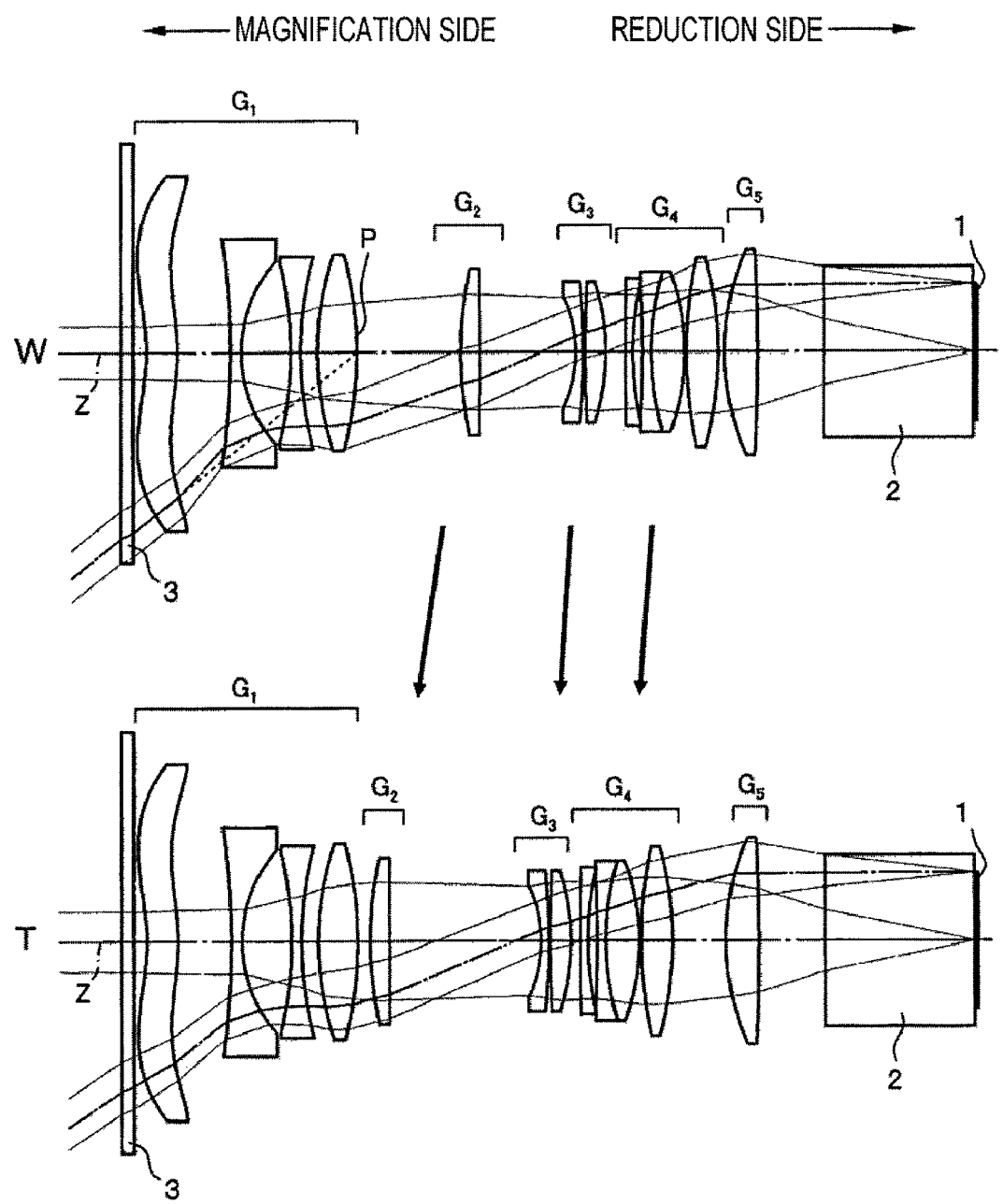
FIG. 6 is a diagram illustrating the trajectory of light beams and the movement of each lens group at the wide angle end (WIDE) and the telephoto end (TELE) of the wide-angle projection zoom lens according to Example 3.
Figure 11:
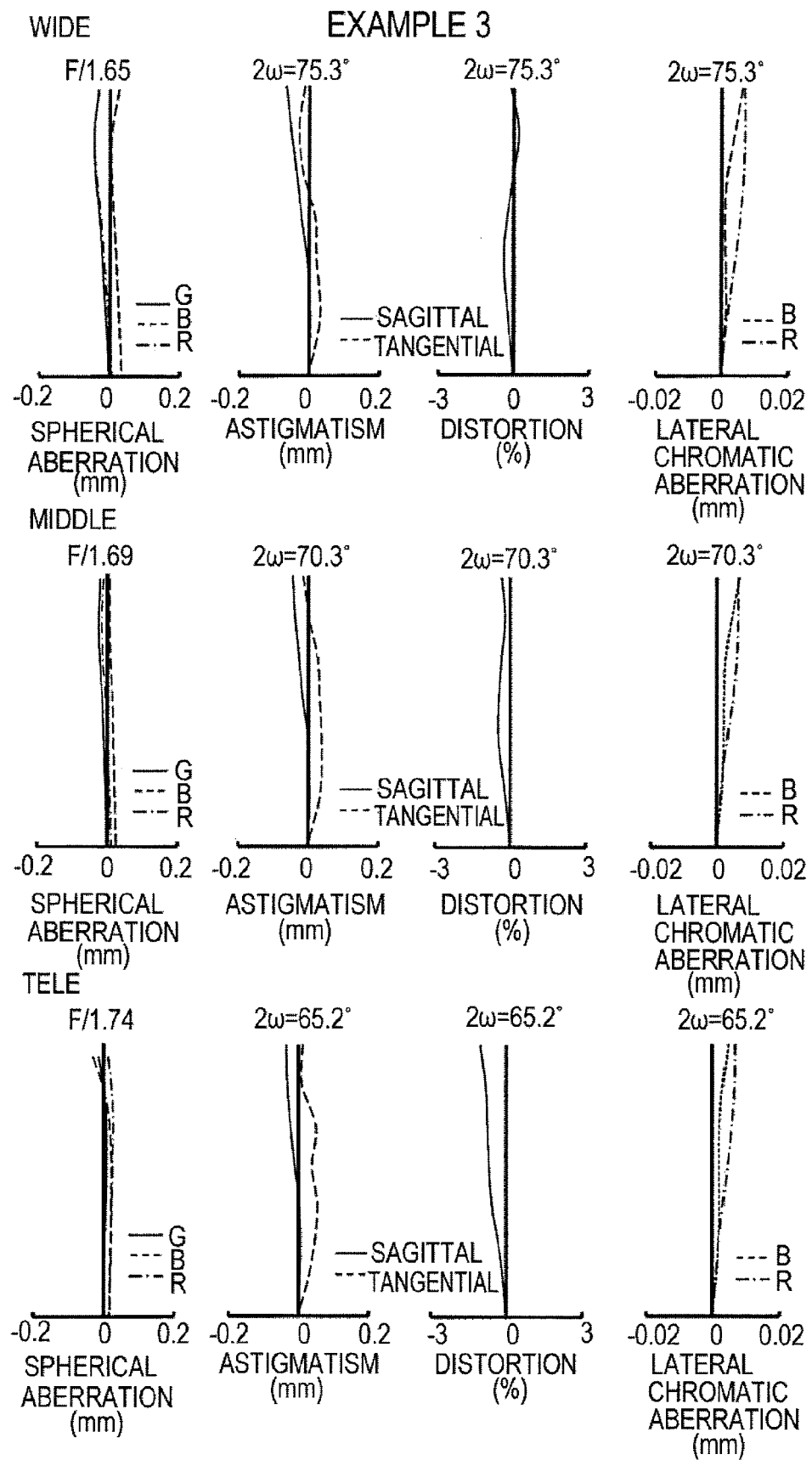
FIG. 11 is a diagram illustrating various aberrations of the wide-angle projection zoom lens according to Example 3 at the wide angle end (WIDE), the middle position (MIDDLE), and the telephoto end (TELE)

A wide-angle projection zoom lens according to Example 3 will be described with reference to FIGS. 5 and 6 showing the structure of the lens and FIG. 11 showing the various aberrations. As shown in FIG. 5, the wide-angle projection zoom lens according to Example 3 has the same basic structure as that according to Example 1 except that a second lens $L_2$ in the first lens group $G_1$ is a biconcave lens, the second lens group $G_2$ includes only a fifth lens $L_5$, which is a biconvex lens, the third lens group $G_3$ includes a sixth lens $L_6$, which is a negative meniscus lens having a concave surface facing the magnification side, and a seventh lens $L_7$, which is a biconvex lens, arranged in this order from the magnification side, and the fourth lens group $G_4$ includes an eighth lens $L_8$, which is a negative meniscus lens having a convex surface facing the magnification side, a cemented lens (having a concave cemented surface facing the reduction side) of a ninth lens $L_9$, which is a biconcave lens, and a tenth lens $L_{10}$, which is a biconvex lens, and an eleventh lens $L_{11}$, which is a biconvex lens, arranged in this order from the magnification side.

As shown in FIG. 6, when power varies, the first lens group $G_1$ and the fifth lens group $G_5$ are fixed and the second to fourth lens groups $G_2$ to $G_4$ are moved during zooming.

In Table 3, an upper part shows the focal length of the entire system from the wide angle end to the telephoto end, the angle of view at the wide angle end, and the speed (F number) of the entire system from the wide angle end to the telephoto end in Example 3.

In Table 3, a middle part shows the curvature radius R of each lens surface, the thickness of the center of each lens and the air space D between the lenses, and the refractive index $N_d$ and the Abbe number $v_d$ of each lens with respect to the d-line.

In Table 3, a lower part shows the distance $D_8$ (variable 1) between the first lens group $G_1$ and the second lens group $G_2$, the distance $D_{10}$ (variable 2) between the second lens group $G_2$ and the third lens group $G_3$, the distance $D_{14}$ (variable 3) between the third lens group $G_3$ and the fourth lens group $G_4$, and the distance $D_{21}$ (variable 4) between the fourth lens group $G_4$ and the fifth lens group $G_5$ at the wide angle end (wide), the middle position (middle), and the telephoto end (tele).

TABLE 3

Focal length: 13.48-16.44, Angle of view: 75.3 degrees, Speed: F1.65-1.74

| Surface number | R | D | $N_d$ | $v_d$ |
|---|---|---|---|---|
| Q1 | ∞ | 2.00 | 1.5240 | 59.8 |
| Q2 | ∞ | 2.00 | | |
| 1* | −29.869 | 5.00 | 1.4910 | 57.5 |
| 2* | −33.937 | 8.41 | | |
| 3 | −126.742 | 1.80 | 1.7174 | 29.5 |
| 4 | 20.403 | 7.93 | | |
| 5 | −58.627 | 1.60 | 1.4875 | 70.2 |
| 6 | 53.574 | 2.69 | | |
| 7 | 45.518 | 6.29 | 1.7618 | 26.5 |
| 8 | −57.696 | **(Variable 1) | | |
| 9 | 57.988 | 3.07 | 1.6968 | 55.5 |
| 10 | −1543.280 | **(Variable 2) | | |
| 11 | −18.732 | 1.20 | 1.5182 | 59.0 |
| 12 | −113.645 | 0.30 | | |
| 13 | 202.742 | 3.37 | 1.7130 | 53.9 |
| 14 | −33.023 | **(Variable 3) | | |
| 15 | 577.362 | 1.20 | 1.8052 | 25.4 |
| 16 | 46.504 | 1.56 | | |
| 17 | −182.804 | 1.40 | 1.8052 | 25.4 |
| 18 | 41.383 | 5.43 | 1.4970 | 81.6 |
| 19 | −33.830 | 0.29 | | |
| 20 | 65.111 | 5.08 | 1.4875 | 70.2 |
| 21 | −52.263 | **(Variable 4) | | |
| 22 | 37.506 | 5.31 | 1.7130 | 53.9 |
| 23 | −318.233 | 10.50 | | |
| 24 | ∞ | 24.10 | 1.5163 | 64.1 |
| 25 | ∞ | 0.14 | | |

*Aspheric coefficient

| Surface number | K | $A_4$ | $A_6$ | $A_8$ |
|---|---|---|---|---|
| First surface | −15.509394 | 5.109214E−05 | −1.177237E−07 | 2.467183E−10 |
| Second surface | −67.411162 | 6.708240E−05 | −1.344810E−07 | 2.867155E−10 |

| Surface number | $A_{10}$ | $A_{12}$ | $A_{14}$ |
|---|---|---|---|
| First surface | −3.375921E−13 | 2.795678E−16 | −9.641889E−20 |
| Second surface | −4.646286E−13 | 6.840195E−16 | −5.411548E−19 |

TABLE 3-continued

Focal length: 13.48-16.44, Angle of view: 75.3 degrees, Speed: F1.65-1.74

| | Middle | Tele |
|---|---|---|
| $D_8$ (Variable 1) | 16.77 | 9.59 | 2.03 |
| $D_{10}$ (Variable 2) | 15.66 | 20.74 | 24.56 |
| $D_{14}$ (Variable 2) | 3.20 | 1.99 | 1.50 |
| $D_{21}$ (Variable 4) | 1.00 | 4.31 | 8.54 |

*Aspheric surface
**Variable spacing

In addition, Table 5 shows numerical values corresponding to the conditional expressions according to Example 3. As shown in Table 5, the wide-angle projection zoom lens according to Example 3 satisfies all of Conditional expressions 1 to 4, and Conditional expressions 1A to 4A.

As can be seen from Table 3 and FIG. 11, according to the wide-angle projection zoom lens of Example 3, aberration is effectively corrected over the entire zoom range, and an appropriate back focal length and high telecentricity on the reduction side are obtained. In addition, it is possible to obtain performances, such as a high speed, a small size, a wide angle of view, and a high zoom ratio, with the best balance therebetween. In particular, it is possible to obtain a high speed of F1.65 and an angle of view 2ω of 75.3 degrees at the wide angle end. Therefore, it is possible to achieve a fast lens with a wide angle of view.

Example 4

Figure 7:
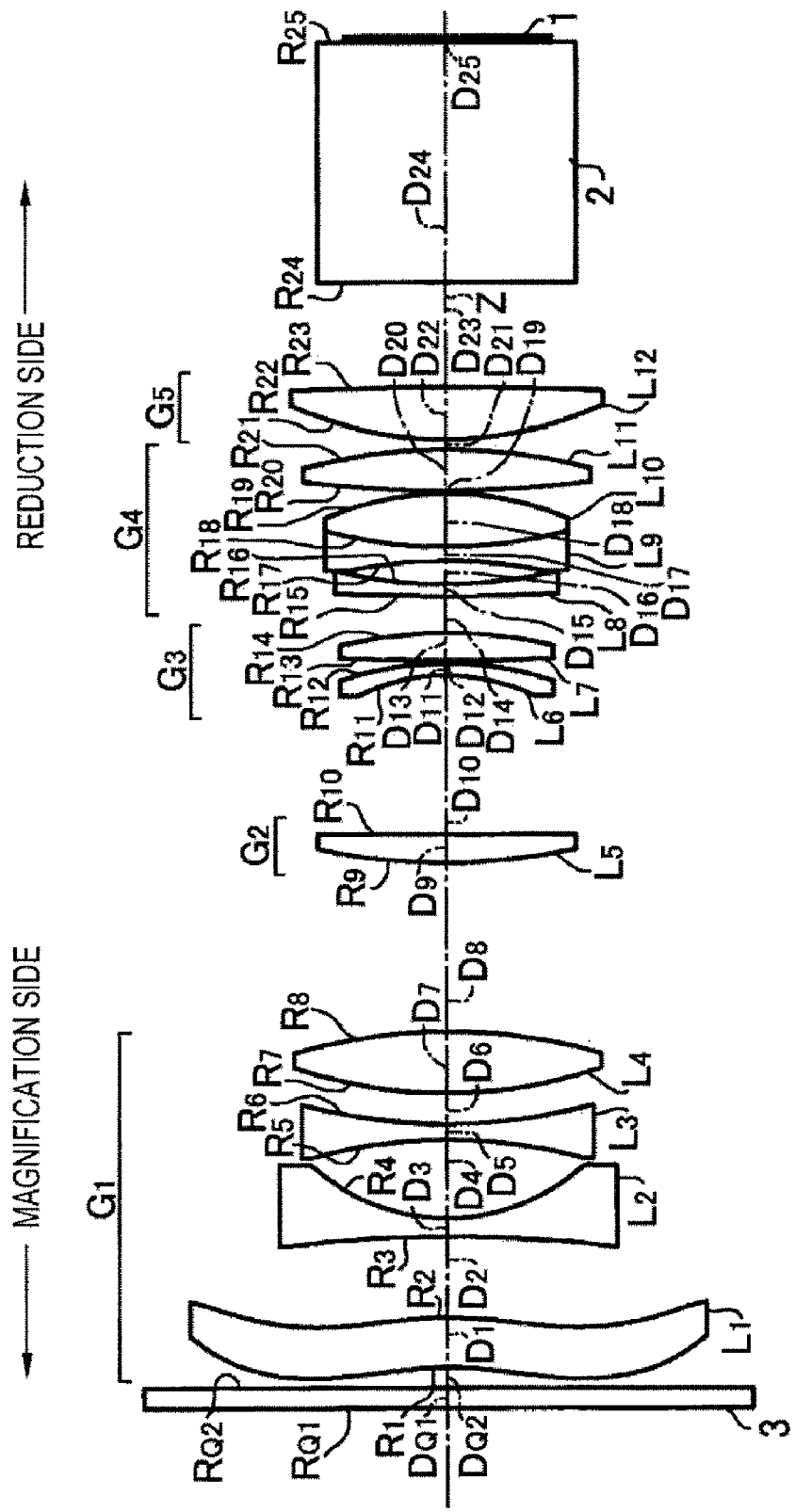
FIG. 7 is a diagram illustrating the detailed structure of a wide-angle projection zoom lens according to Example 4.
Figure 8:
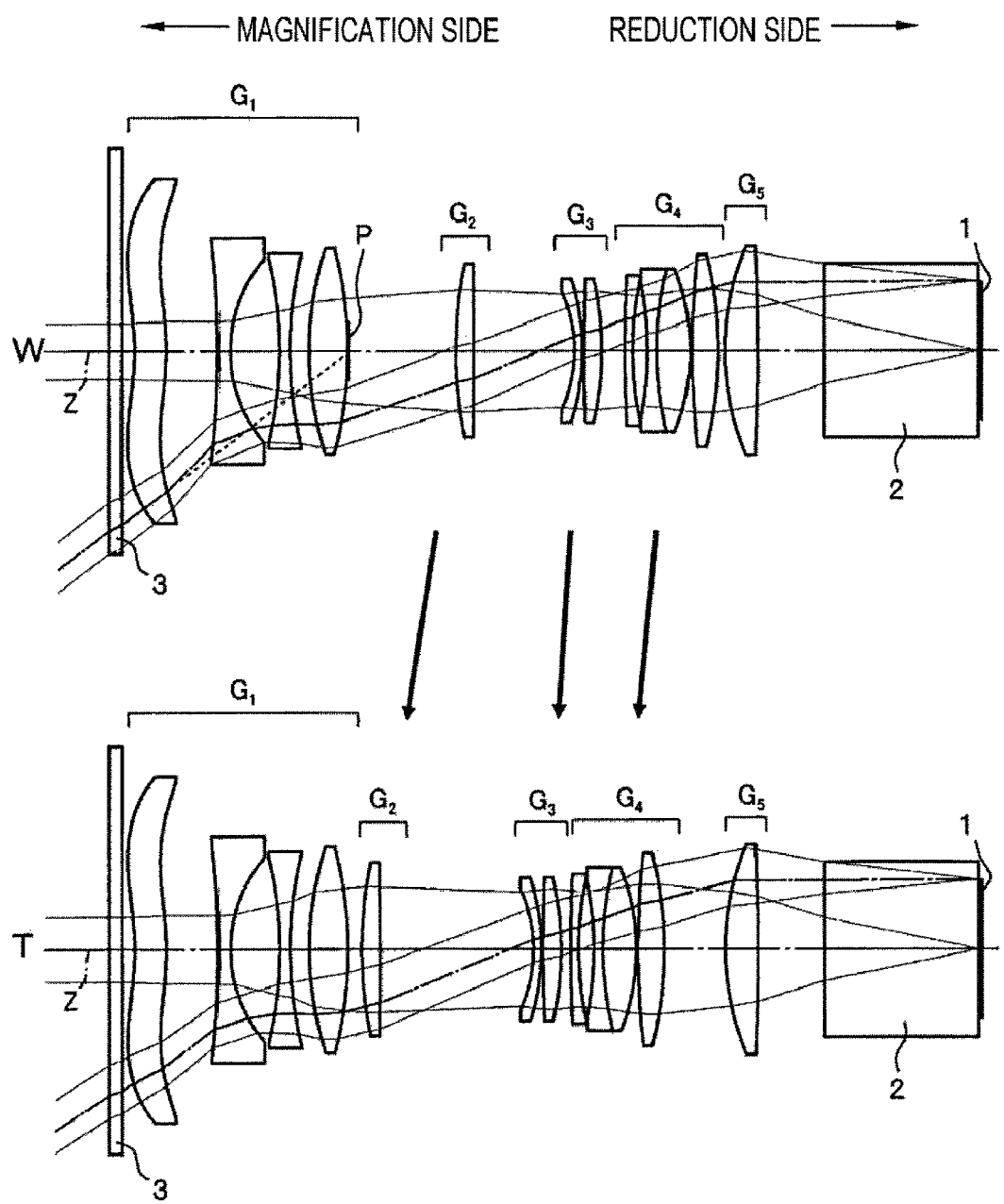
FIG. 8 is a diagram illustrating the trajectory of light beams and the movement of each lens group at the wide angle end (WIDE) and the telephoto end (TELE) of the wide-angle projection zoom lens according to Example 4.
Figure 12:
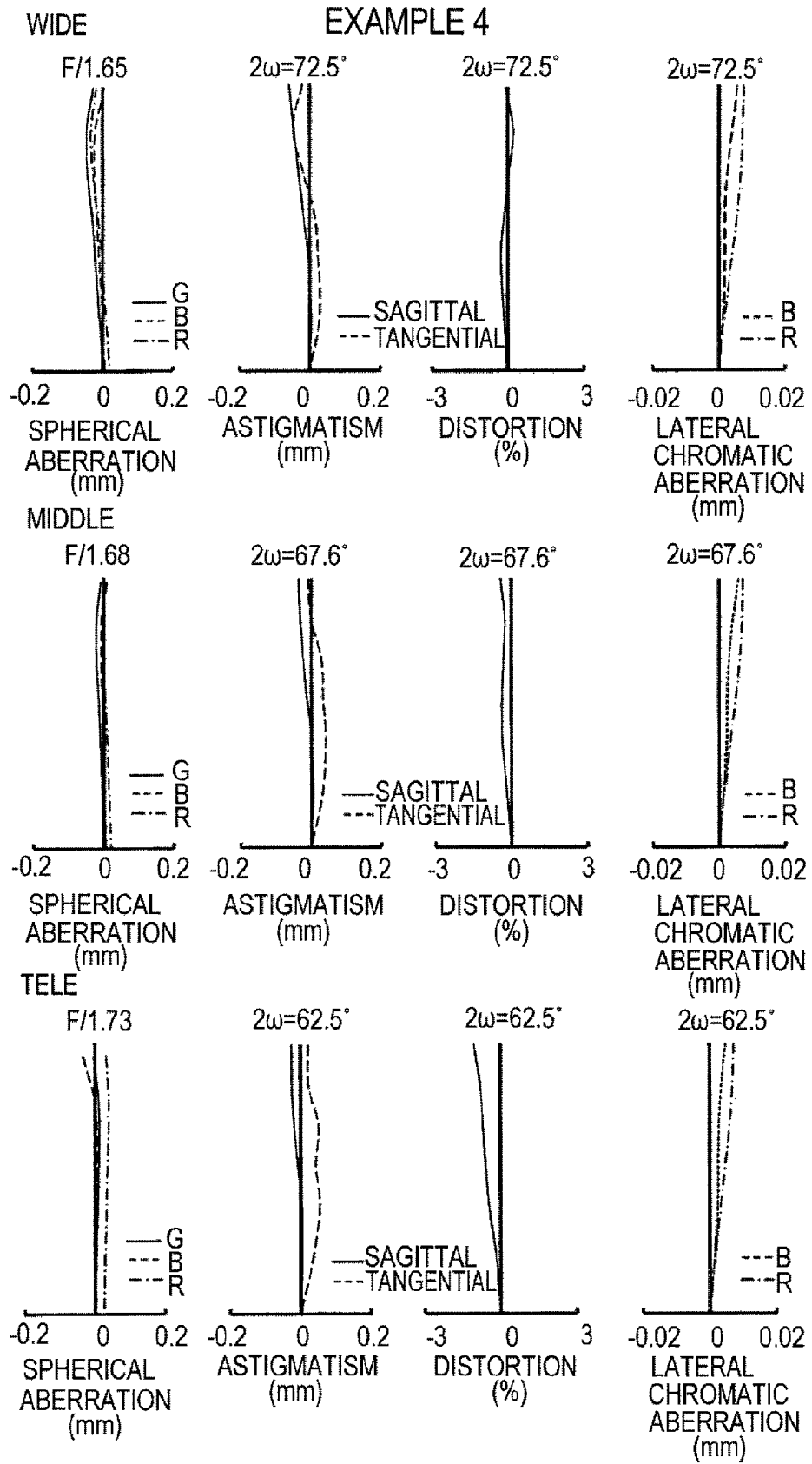
FIG. 12 is a diagram illustrating various aberrations of the wide-angle projection zoom lens according to Example 4 at the wide angle end (WIDE), the middle position (MIDDLE), and the telephoto end (TELE)

A wide-angle projection zoom lens according to Example 4 will be described with reference to FIGS. 7 and 8 showing the structure of the lens and FIG. 12 showing the various aberrations. As shown in FIG. 7, the basic structure of the wide-angle projection zoom lens according to Example 4 is similar to that of the wide-angle projection zoom lens according to Example 3.

As shown in FIG. 8, when power varies, the first lens group $G_1$ and the fifth lens group $G_5$ are fixed and the second to fourth lens groups $G_2$ to $G_4$ are moved during zooming.

In Table 4, an upper part shows the focal length of the entire system from the wide angle end to the telephoto end, the angle of view at the wide angle end, and the speed (F number) of the entire system from the wide angle end to the telephoto end in Example 4.

In Table 4, a middle part shows the curvature radius R of each lens surface, the thickness of the center of each lens and the air space D between the lenses, and the refractive index $N_d$ and the Abbe number $v_d$ of each lens with respect to the d-line.

In Table 4, a lower part shows the distance $D_8$ (variable 1) between the first lens group $G_1$ and the second lens group $G_2$, the distance $D_{10}$ (variable 2) between the second lens group $G_2$ and the third lens group $G_3$, the distance $D_{14}$ (variable 3) between the third lens group $G_3$ and the fourth lens group $G_4$, and the distance $D_{21}$ (variable 4) between the fourth lens group $G_4$ and the fifth lens group $G_5$ at the wide angle end (wide), the middle position (middle), and the telephoto end (tele).

TABLE 4

Focal length: 14.20-17.31, Angle of view: 72.5 degrees, Speed: F1.65-1.73

| Surface number | R | D | $N_d$ | $v_d$ |
|---|---|---|---|---|
| Q1 | ∞ | 2.00 | 1.5240 | 59.8 |
| Q2 | ∞ | 2.00 | | |

TABLE 4-continued

Focal length: 14.20-17.31, Angle of view: 72.5 degrees, Speed: F1.65-1.73

| | | | | |
|---|---|---|---|---|
| 1* | −35.384 | 5.00 | 1.4910 | 57.5 |
| 2* | −37.719 | 8.13 | | |
| 3 | −139.481 | 1.80 | 1.7174 | 29.5 |
| 4 | 20.436 | 7.85 | | |
| 5 | −53.671 | 1.60 | 1.4875 | 70.2 |
| 6 | 57.748 | 3.05 | | |
| 7 | 48.114 | 6.16 | 1.7618 | 26.5 |
| 8 | −56.837 | **(Variable 1) | | |
| 9 | 61.840 | 2.93 | 1.7859 | 44.2 |
| 10 | −4024.023 | **(Variable 2) | | |
| 11 | −20.663 | 1.20 | 1.5814 | 40.7 |
| 12 | −34.937 | 0.30 | | |
| 13 | 272.377 | 2.84 | 1.7130 | 53.9 |
| 14 | −45.535 | **(Variable 3) | | |
| 15 | 261.226 | 1.20 | 1.8467 | 23.8 |
| 16 | 47.535 | 2.42 | | |
| 17 | −49.194 | 1.40 | 1.8467 | 23.8 |

TABLE 4-continued

Focal length: 14.20-17.31, Angle of view: 72.5 degrees, Speed: F1.65-1.73

| | | | | |
|---|---|---|---|---|
| 18 | 46.982 | 5.38 | 1.4970 | 81.6 |
| 19 | −31.696 | 0.29 | | |
| 20 | 122.918 | 4.17 | 1.8044 | 39.6 |
| 21 | −55.998 | **(Variable 4) | | |
| 22 | 39.013 | 5.17 | 1.7432 | 49.3 |
| 23 | −315.245 | 10.50 | | |
| 24 | ∞ | 24.10 | 1.5163 | 64.1 |
| 25 | ∞ | 0.14 | | |

*Aspheric coefficient

| Surface number | K | $A_4$ | $A_6$ | $A_8$ |
|---|---|---|---|---|
| First surface | −8.749610 | 4.098289E−05 | −9.152886E−08 | 1.894436E−10 |
| Second surface | −12.551552 | 3.614807E−05 | −5.867228E−08 | 3.545471E−11 |

| Surface number | $A_{10}$ | $A_{12}$ | $A_{14}$ |
|---|---|---|---|
| First surface | −2.676731E−13 | 2.413109E−16 | −1.001205E−19 |
| Second surface | 1.064074E−13 | −2.411602E−16 | 1.354388E−19 |

| | Wide | Middle | Tele |
|---|---|---|---|
| $D_8$ (Variable 1) | 17.02 | 9.75 | 2.17 |
| $D_{10}$ (Variable 2) | 15.84 | 20.50 | 24.22 |
| $D_{14}$ (Variable 2) | 3.69 | 2.23 | 1.50 |
| $D_{21}$ (Variable 4) | 1.00 | 5.07 | 9.66 |

*Aspheric surface
**Variable spacing

In addition, Table 5 shows numerical values corresponding to the conditional expressions according to Example 4. As shown in Table 5, the wide-angle projection zoom lens according to Example 4 satisfies all of Conditional expressions 1 to 4, and Conditional expressions 1A to 4A.

As can be seen from Table 4 and FIG. 12, according to the wide-angle projection zoom lens of Example 4, aberration is effectively corrected over the entire zoom range, and an appropriate back focal length and high telecentricity on the reduction side are obtained. In addition, it is possible to obtain performances, such as a high speed, a small size, a wide angle of view, and a high zoom ratio, with the best balance therebetween. In particular, it is possible to obtain a high speed of F1.65 and an angle of view 2ω of 72.5 degrees at the wide angle end. Therefore, it is possible to achieve a fast lens with a wide angle of view.

TABLE 5

| Conditional expression No. | Expression | Lower limit | Upper limit | Example 1 | Example 2 | Example 3 | Example 4 |
|---|---|---|---|---|---|---|---|
| (1), (1A) | $Bf/f_w$ | 1.6, 1.7 | 2.6, 2.5 | 1.9 | 2.2 | 2.0 | 1.9 |
| (2), (2A) | $|f_1/f_w|$ | 1.5, 1.7 | 4.5, 4.2 | 1.8 | 2.1 | 4.1 | 4.0 |
| (3), (3A) | $d2/f_w$ | 0.35, 0.40 | —, 0.70 | 0.44 | 0.56 | 0.62 | 0.57 |
| (4), (4A) | $Ls/f_w$ | 2.0, 2.2 | 3.0, 2.7 | 2.2 | 2.3 | 2.5 | 2.4 |

What is claimed is:

1. A wide-angle projection zoom lens comprising:
a first lens group having a negative refractive power;
a second lens group having a positive refractive power;
a third lens group having a negative refractive power;
a fourth lens group having a positive refractive power; and
a fifth lens group having a positive refractive power,
wherein the first to fifth lens groups are arranged in this order from a magnification side and a reduction side has telecentricity,
during zooming from a wide angle end to a telephoto end, said first lens group and said fifth lens group are fixed, and said second lens group, said third lens group, and said fourth lens group are moved to the magnification side on an optical axis while changing gaps therebetween,
said first lens group includes a first negative lens, a second negative lens, a third negative lens, and a fourth positive lens which are arranged in this order from the magnification side,
said first lens is an aspheric lens made of plastic, and
the wide-angle projection zoom lens satisfies the following conditional expressions:

$1.6 < Bf/f_W < 2.6$;

$1.5 < |f_1/f_W| < 4.5$;

$0.35 < D_2/f_W$; and $2.0 < L_S/f_W < 3.0$ where Bf indicates a back focal length, $f_W$ indicates the focal length of the entire system at the wide angle end, $f_1$ indicates the focal length of said first lens group, $D_2$ indicates the distance between a reduction-side surface of said first lens and a magnification-side surface of said second lens on the optical axis in said first lens group, and $L_S$ indicates the distance from a magnification-side surface of said first lens to a magnification side pupil position at the wide angle end.

2. The wide-angle projection zoom lens according to claim 1,
wherein said second lens group includes one or two positive lenses.

3. The wide-angle projection zoom lens according to claim 1,
wherein said third lens group includes one negative lens and one positive lens which are arranged in this order from the magnification side,
a reduction-side surface of said one negative lens is a concave surface, and a magnification-side surface of said one positive lens is a convex surface,
said fourth lens group includes a negative meniscus lens having a convex surface facing the magnification side, a cemented lens having a concave cemented surface facing the magnification side, and a positive lens which are arranged in this order from the magnification side.

4. The wide-angle projection zoom lens according to claim 1,
wherein said third lens group includes one negative lens and one positive lens which are arranged in this order from the magnification side,
a magnification-side surface of said one negative lens is a concave surface, and a reduction-side surface of said one positive lens is a convex surface,
said fourth lens group includes a negative meniscus lens having a convex surface facing the magnification side, a cemented lens having a concave cemented surface facing the reduction side, and a positive lens which are arranged in this order from the magnification side.

5. The wide-angle projection zoom lens according to claim 1,
wherein the entire first lens group is moved to perform focusing while changing a gap between said third lens and said fourth lens in said first lens group.

6. The wide-angle projection zoom lens according to claim 1,
wherein a cover glass is provided on the magnification side of the first lens group.

7. A projection display device comprising:
a light source;
a light valve;
an illumination optical unit that guides light emitted from the light source to the light valve; and
said wide-angle projection zoom lens according to claim 1,
wherein the light valve modulates the light emitted from the light source, and
the modulated light is projected onto a screen by the wide-angle projection zoom lens.

* * * * *